(12) United States Patent
Oogane

(10) Patent No.: US 8,327,898 B2
(45) Date of Patent: Dec. 11, 2012

(54) PNEUMATIC TIRE

(75) Inventor: Shun Oogane, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 319 days.

(21) Appl. No.: 12/741,092

(22) PCT Filed: Nov. 10, 2008

(86) PCT No.: PCT/JP2008/070439
§ 371 (c)(1),
(2), (4) Date: May 3, 2010

(87) PCT Pub. No.: WO2009/060974
PCT Pub. Date: May 14, 2009

(65) Prior Publication Data
US 2010/0252164 A1    Oct. 7, 2010

(30) Foreign Application Priority Data
Nov. 8, 2007    (JP) .................. 2007-291026

(51) Int. Cl.
*B60C 15/00*    (2006.01)
*B60C 9/02*    (2006.01)
(52) U.S. Cl. ......... 152/539; 152/548; 152/552; 152/554
(58) Field of Classification Search .................. None
See application file for complete search history.

(56) References Cited

U.S. PATENT DOCUMENTS

| 4,705,091 | A | * | 11/1987 | Iuchi .......................... 152/541 |
| 5,056,575 | A | | 10/1991 | Yamaguchi et al. |
| 5,236,031 | A | | 8/1993 | Honbo et al. |
| 5,433,257 | A | | 7/1995 | Yamaguchi et al. |
| 2004/0007305 | A1 | * | 1/2004 | Ueyoko ................... 152/552 |

FOREIGN PATENT DOCUMENTS

| EP | 1 393 931 A1 | 3/2004 |
| JP | 1-111504 A | 4/1989 |

(Continued)

OTHER PUBLICATIONS

Australian Office Action issued in Australian application 2008325550 dated Apr. 28, 2011 (2 pages).
International Search Report dated Jan. 20, 2009 (with translation) (4 pages).
European Search Report issued in European Application No. 08848277.3-2425 / 2216189 dated Mar. 22, 2011 (5 pages).

(Continued)

*Primary Examiner* — Justin Fischer
(74) *Attorney, Agent, or Firm* — Sughrue Mion, PLLC

(57) ABSTRACT

An of object of the present invention is to provide a pneumatic tire which exhibits improved durability of a bead portion due to further suppressing compression strain at a carcass ply fold-up portion and, in particular, suppressing fatigue fracture at the carcass ply fold-up portion. Cord distance between the carcass main body and the carcass ply fold-up portion gradually decreases from the bead core toward the outer side in the tire radial direction to reach the minimum value a, then gradually increases to the maximum value b; provided that height $H_f$ of a flange of an application rim, measured from a base line of the application rim in a state where the tire is assembled with the rim and inflated at a prescribed internal pressure, is 1, heights $H_A$ and $H_B$ measured from the base line to the positions on the carcass main body corresponding to the minimum and the maximum values, respectively, and the maximum height $H_T$ of the tire satisfy relationship formulae below, $H_T \geq 8.00$ $1.26 \leq H_A \leq 2.14$ $2.43 \leq H_B \leq 3.75$; and a value of ratio (b/a) of the maximum value b with respect to the minimum value a of distance between cords of the carcass main body and the carcass ply fold-up portion exceeds 1.00.

6 Claims, 4 Drawing Sheets

FOREIGN PATENT DOCUMENTS

| | | | |
|---|---|---|---|
| JP | 1-317814 | A | 12/1989 |
| JP | 2-267012 | A | 10/1990 |
| JP | 04-185510 | A | 7/1992 |
| JP | 2007-191090 | A | 8/2007 |
| WO | 02/085647 | A1 | 10/2002 |

OTHER PUBLICATIONS

Japanese Office Action issued in Application No. 2007-291026 dated May 8, 2012.

* cited by examiner (a)

(b)

PNEUMATIC TIRE

TECHNICAL FIELD

The present invention relates to a pneumatic tire, in particular, a pneumatic tire having improved durability of a bead portion.

PRIOR ART

A pneumatic tire for a construction vehicle includes a carcass main body constituted of a ply which is made by rubber coated plural cords extending in a toroidal shape across a pair of bead cores, and a carcass ply fold-up portion constituted of the ply folded up around each bead core from the carcass main body side, i.e. the tire inner side, toward the tire outer side to extend the outer side in the tire radial direction.

Tires of this type frequently run in a wildland having a very irregular surface due to projections, rocks, stones and the like with a relatively heavy load exerted thereon. Accordingly, it has been known to improve durability of a bead portion of such a tire so that the tire can bear use in a harsh environment.

However, when the tire receives a relatively large load and is deformed, compression strain is generated in a carcass ply fold-up portion provided for contributing to improving durability of a bead portion, and repeated generation of such compression strain in the carcass ply fold-up portion in a particularly harsh environment may result in fatigue fractures.

Such fatigue fracture of the carcass ply fold-up portion as described above significantly shortens the product life of the tire. Therefore, it has been a demand on such a tire as described above that fatigue fracture at the carcass ply fold-up portion should be suppressed.

It is assumed that compression strain, eventually causing fatigue fracture of a carcass ply fold-up portion, is generated because the carcass ply fold-up portion is located on the compression side in bending deformation occurring when a bead portion is collapse-deformed with a carcass main body being the neutral axis of bending. In view of this, it is generally known, as a representative technology to reduce compression strain, to dispose the carcass ply fold-up portion as close to the carcass main body as possible to suppress compression strain at the carcass ply fold-up portion.

Further, this technology also has an effect of suppressing shear strain of rubber between the outer side surface of the bead portion and the carcass ply fold-up portion, which shear strain is generated due to deformation of the carcass ply folded-up portion in a portion where a rim flange of an applied rim is in contact with the bead portion. Yet further, the technology is also effective to suppress separation of rubber, which occurs along the carcass ply fold-up portion.

However, simply disposing the carcass ply fold-up portion close to the carcass main body facilitates shear strain of rubber present between the carcass ply fold-up portion and the carcass main body, thereby causing rubber separation between the carcass ply fold-up portion and the carcass main body to occur at a relatively early stage in use of the tire.

Further, although compression strain is suppressed by disposing the carcass ply fold-up portion close to the carcass main body, bending rigidity of the carcass ply fold-up portion rather deteriorates by disposing the carcass ply fold-up portion close to the carcass main body in a portion on the outer side in the tire radial direction of the sites where compression strain is suppressed.

That is, although it is known that disposing the carcass ply fold-up portion close to the carcass main body is an effective measure to suppress compression strain at the carcass ply fold-up portion, such a measure facilitates shear strain of rubber between the carcass ply fold-up portion and the carcass main body, thereby causing a problem that bending rigidity at the carcass ply fold-up portion deteriorates.

In view of the facts above, JP 04-185510 proposes a technology in which: the carcass shape is designed such that cord distance between the carcass main body and the carcass ply fold-up portion once gradually decreases from the bead core toward the outer side in the tire radial direction to reach the minimum value, then gradually increases to the maximum value and again gradually decreases to reach the smallest value at the end of the carcass ply fold-up portion; and shear strain of rubber between the carcass ply fold-up portion and the carcass main body and deterioration of bending rigidity at the carcass ply fold-up portion are suppressed by adjusting, in a state where the tire is assembled with an application rim, the height of the rim flange and the heights measured from the rim base line of the application rim to the positions on the carcass main body corresponding to the minimum and the maximum values, respectively, so that compression strain at the carcass ply fold-up portion is reduced.

DISCLOSURE OF THE INVENTION

Problems to be Solved by the Invention

However, in a case of a tire for a construction vehicle, the tire is getting larger and heavier in recent years and the rim flange height $H_f$ tends to be set relatively small with respect to the tire height $H_T$ to reduce the weight of the tire, whereby the magnitude of collapse-deformation of a bead portion tends to be relatively large, facilitating fatigue fracture at a carcass ply fold-up portion, in particular, the middle portion thereof. As a result, it is becoming more difficult to address the problems described above by the structures of the prior art.

In view of the situation above, an object of the present invention is to provide a pneumatic tire which exhibits improved durability of a bead portion in a recent harsh environment in use by further suppressing compression strain, in particular, fatigue fracture at a carcass ply fold-up portion.

Means for Solving the Problem

First, strain occurring at a carcass ply fold-up portion of a tire when the tire is compression-deformed will be described by showing a section in the widthwise direction of portions of a bead portion and a sidewall portion in a state where the tire is assembled with an application rim and inflated at a prescribed internal pressure. In FIG. 1, reference number 1 represents a bead core, 2 represents a carcass main body, 3 represents a carcass ply fold-up portion, 4 represents an application rim, and 5 represents a rim flange.

In the present invention, an "application rim" represents a rim suitable for making performances of a tire be effectively demonstrated. A prescribed "internal pressure" represents a "pressure value (gauge pressure value) of an air chamber of a tire for each mounting position, specified for each vehicle by a car manufacture". A "pressure" of a tire air chamber described in the present specification represents, unless described otherwise, a gauge pressure (a pressure indicated by a gauge).

When a tire receives load and is compression-deformed, bending deformation is generated in a part of the bead portion and a part of the sidewall portion with the carcass main body 2 functioning as the neutral axis of bending. In this state, as shown in FIG. 1(a), compression deformation as shown in arrow $C_2$ occurs as a result of bending deformation toward a direction indicated by arrow $C_1$ in a region C on the outer side in the radial direction of the rim flange 5. Further, tensile deformation as shown in arrow $T_2$ occurs as a result of bending deformation toward a direction indicated by arrow $T_1$ in a region T on the outer side in the radial direction of the region C.

As described above, compression deformation and tensile deformation are locally generated in respective bead portions and respective sidewall portions during bending deformation of a tire, so that compression force and tensile force caused by these deformations are exerted on parts corresponding to the regions C, T of the carcass ply fold-up portion. As a result, compression strain and tensile strain are generated in the respective regions, as shown in FIG. 1(b).

Compression strain is suppressed by disposing the carcass ply fold-up portion 3 close to the carcass main body 2 as described above. The inventors of the present invention discovered that compression strain occurring at the carcass ply fold-up portion 3 can be further suppressed by making tensile force occurring in the region T act on the carcass ply fold-up portion of the region C, completing the present invention.

Specifically, the gist of the present invention is as follows.

(1) A pneumatic tire, comprising as skeleton a carcass including a carcass main body constituted of a ply which is made by rubber coated plural cords extending in a toroidal shape across a pair of bead cores, and a carcass ply fold-up portion constituted of the ply folded up around each bead core from the carcass main body side, i.e. the tire inner side, toward the tire outer side to extend the outer side in the tire radial direction, characterized in that: cord distance between the carcass main body and the carcass ply fold-up portion gradually decreases from the bead core toward the outer side in the tire radial direction to reach the minimum value a, then gradually increases to the maximum value b; provided that height $H_f$ of a flange of an application rim, measured from a base line of the application rim in a state where the tire is assembled with the rim and inflated at a prescribed internal pressure, is 1, heights $H_A$ and $H_B$ measured from the base line to the positions on the carcass main body corresponding to the minimum and the maximum values, respectively, and the maximum height $H_T$ of the tire satisfy relationship formulae below, $H_T \geq 8.00$ $1.26 \leq H_A \leq 2.14$ $2.43 \leq H_B \leq 3.75$; and a value of ratio (b/a) of the maximum value b with respect to the minimum value a of distance between cords of the carcass main body and the carcass ply fold-up portion exceeds 1.00.

(2) The pneumatic tire of (1) above, characterized in that the ratio b/a is in the range of 1.40 to 4.00 (1.40 and 4.00 are inclusive).

(3) The pneumatic tire of (1) or (2) above, characterized in that the ratio b/a is in the range of 2.00 to 3.00 (1.40 and 4.00 are inclusive).

Effect of the Invention

In the present invention, heights measured from the base line to the positions on the carcass main body corresponding to the minimum and the maximum values, respectively, in a state where the tire is assembled with the application rim and inflated at a prescribed internal pressure are strictly controlled, whereby shear strain exerted on rubber between the carcass ply fold-up portion and the carcass main body is suppressed and compression strain occurring at the carcass ply fold-up portion can be suppressed without decreasing bending rigidity of the carcass ply fold-up portion. As a result, fatigue fracture of the carcass ply fold-up portion due to such compression strain as described above is suppressed, so that durability of the bead portion improves. Further, suppression of shear strain can be further facilitated by controlling a ratio of the maximum value with respect to the minimum value, of distance between cords of the carcass main body and the carcass ply fold-up portion.

Figure 1:
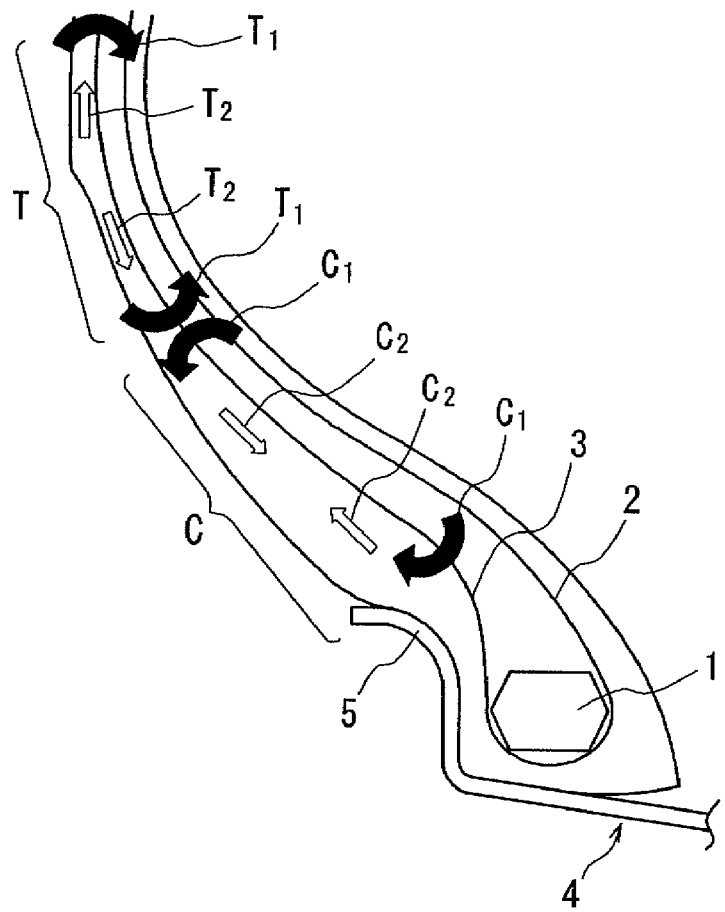
FIG. 1(a) is a view showing regions where compression force and tensile force are generated and FIG. 1(b) is a view showing displacement of compression strain and tensile strain.
Figure 1:
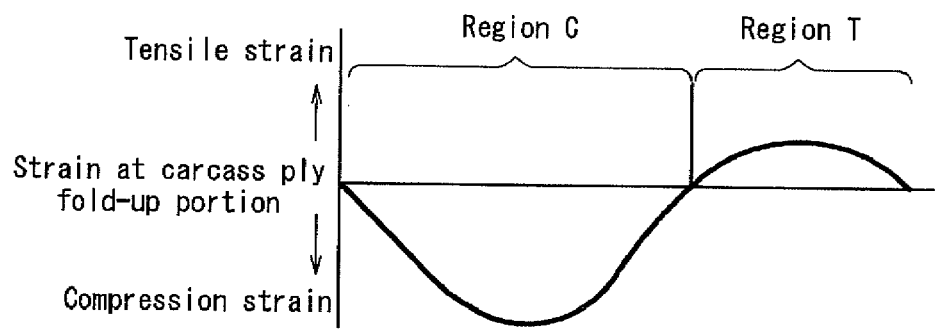

| Explanation of Reference Numerals | |
|---|---|
| 1 | Bead core |
| 2 | Carcass main body |
| 3 | Carcass ply fold-up portion |
| 4 | Application rim |
| 5 | Rim flange |
| 6 | Belt |
| 7 | Tread portion |
| 8 | Tire |

BEST MODE FOR IMPLEMENTING THE INVENTION

Figure 2:
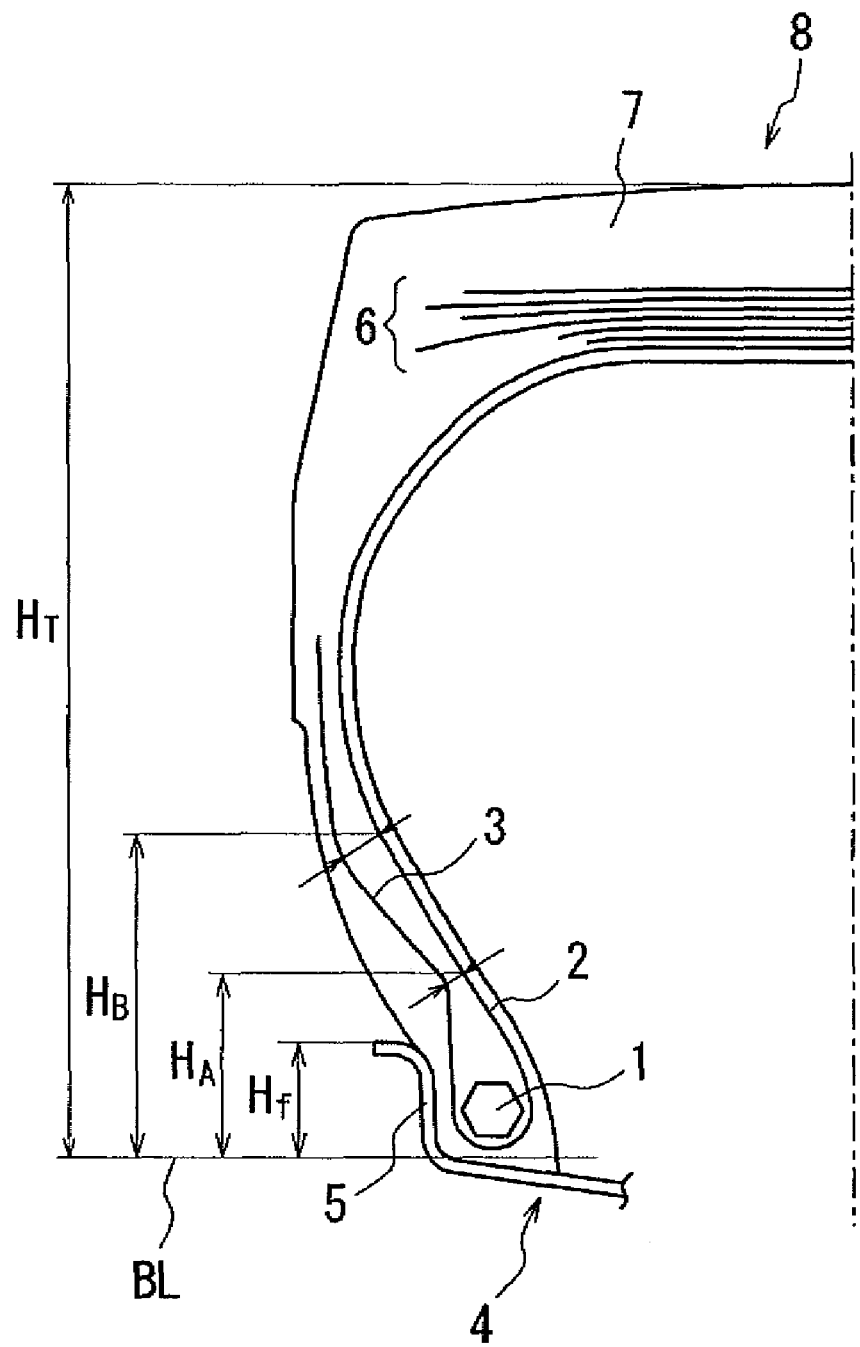
FIG. 2 is a sectional view in the widthwise direction of a pneumatic tire of the present invention.
Figure 4:
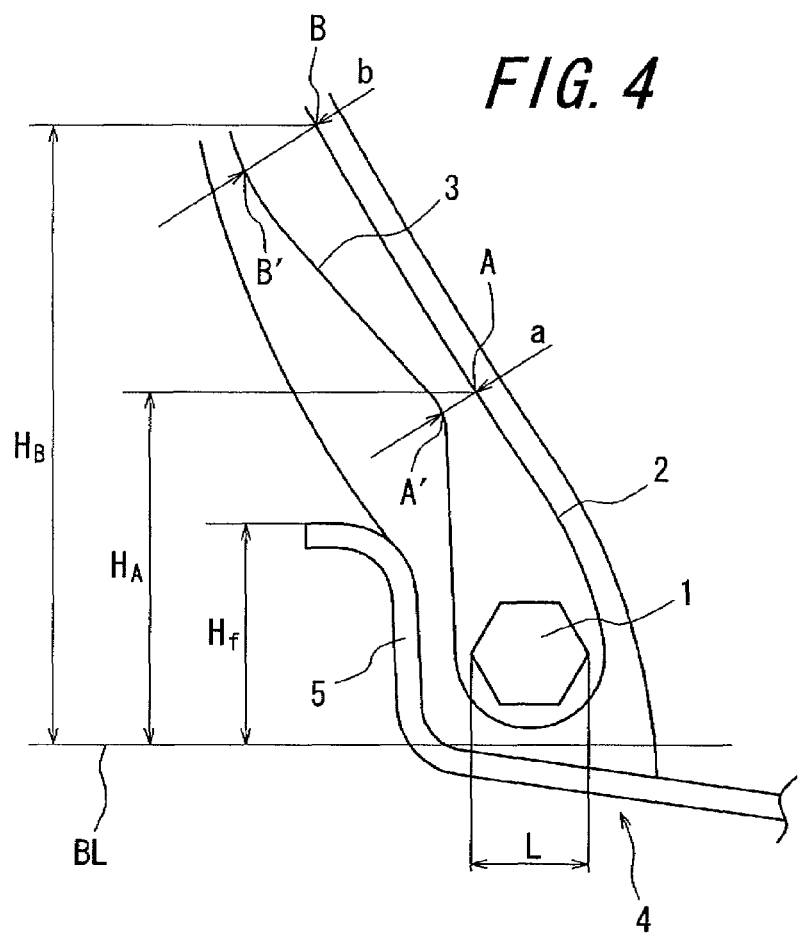
FIG. 4 is a sectional view in the widthwise direction of a part of a bead portion and a part of a sidewall portion of the pneumatic radial tire of the present invention.

Hereinafter, the present invention will be described in detail. FIG. 2 shows a half of a section in the widthwise direction of a pneumatic tire of the present invention. FIG. 4 shows in an enlarged manner a section in the widthwise direction of a bead portion of the pneumatic tire.

In FIG. 2, reference number 1 represents a bead core, 2 represents a carcass main body constituted of a ply which is made by rubber coated plural cords extending in a toroidal shape across a pair of bead cores, and 3 represents a carcass ply fold-up portion constituted of the ply folded up around each bead core from the carcass main body 2 side, i.e. the tire inner side, toward the tire outer side to extend the outer side in the tire radial direction. The carcass is constituted of the carcass main body 2 and the carcass fold-up portion 3.

A belt 6 is disposed on the outer side in the radial direction of the carcass main body 2 and a tread portion 7 is provided on the outer side in the radial direction of the belt 6, constituting a tire 8. In FIG. 4, similar to FIG. 1, reference number 4 represents an application rim, 5 represents a rim flange, and BL represents a base line of the application rim extending in parallel with the rotational axis of the tire (which line will be referred to as "the rim base line" hereinafter).

The distance between cords of the carcass main body 2 and the carcass ply fold-up portion 3 is designed to gradually decrease from the vicinity of the bead core 1 toward the outer side in the tire radial direction to once reach the minimum value and then gradually increase toward the outer side in the tire radial direction to reach the maximum value.

Specifically, the distance between cords of the carcass main body 2 and the carcass ply fold-up portion 3 gradually decreases to reach the minimum value, so that compression strain exerted on the carcass main body 3 is decreased. More specifically, the carcass ply fold-up portion 3 is positioned closer to the neutral axis of bending by disposure of the carcass ply fold-up portion 3 proximate to the carcass main body 2, whereby compressing action of the carcass ply fold-up portion 3 in the minimum-distance region is decreased. As a result, compression strain at the carcass ply fold-up portion 3 is suppressed and thus fatigue fractures can be suppressed.

Further, since the distance between cords of the carcass ply fold-up portion 3 and the carcass main body 2 gradually decreases, the distance between the carcass ply fold-up portion 3 and the outer tire surface of the bead portion increases, whereby shear strain occurring between the carcass ply fold-up portion 3 and the outer surface of the bead portion is alleviated and decreased. As a result, separation between the carcass ply fold-up portion 3 and rubber can be suppressed.

Figure 3:
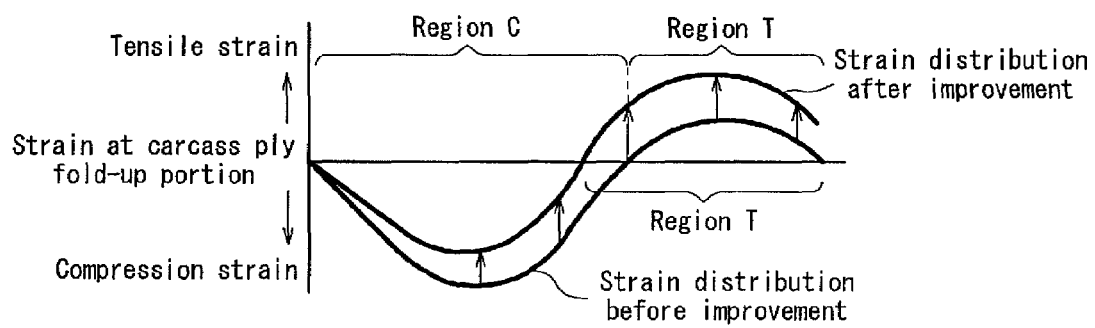
FIG. 3 is a view showing change in displacement of compression strain and tensile strain.

Yet further, since the distance between cords of the carcass ply fold-up portion 3 and the carcass main body 2 gradually increases from the minimum value position toward the outer side in the radial direction, to reach the maximum value, the carcass ply fold-up portion in that region is positioned away from the neutral axis of bending, whereby tensile force is further increased and thus tensile strain increases. Therefore, as shown in FIG. 3, the region T increases and an effect caused by compression force decreases accordingly. As a result, compression strain exerted on the carcass ply fold-up portion 3 decreases, whereby fatigue fractures of the carcass can be suppressed.

In the present embodiment, as shown in FIG. 4, provided that the cord center point of the carcass main body 2 corresponding to the cord-distance minimum value is A, the cord center point of the carcass main body 2 corresponding to the cord-distance maximum value is B, the cord center point where a line drawn from A to be normal to the carcass main body 2 intersects the carcass ply fold-up portion 3 is A', and the cord center point where a line drawn from B to be normal to the carcass main body 2 intersects the carcass ply fold-up portion 3 is B', the distance A-A' between the cords is a and the distance B-B' between the cords is b.

In the present embodiment, the minimum value a between the cords is preferably 0.18 to 0.33 times as much as a largest diameter L of a section of the bead core. Specifically, in a case where the minimum value a is smaller than 0.18 times as much as a largest diameter L of a section of the bead core, bending rigidity at the bead portion is not sufficient and the bead core is collapse deformed at a significant degree, whereby shear strain of rubber present between the carcass ply fold-up portion and the carcass main body rather increases. In a case where the minimum value a exceeds 0.33 times as much as a largest diameter L of a section of the bead core, the carcass ply fold-up portion 3 is positioned too remote from the carcass main body 2, whereby compression strain occurring the carcass ply fold-up portion 3 significantly increases. Further, in the case where the minimum value a exceeds 0.33 times as much as a largest diameter L of a section of the bead core, the carcass ply fold-up portion 3 is positioned to close to the outer surface of the bead portion, whereby shear strain of rubber between the outer surface of the bead portion and the carcass ply fold-up portion 3 increases and durability of the bead portion cannot be improved.

As shown in FIGS. 2 and 4, provided that the maximum height of the tire is $H_T$, the height measured from the rim base line BL to the position A of the carcass main body 2 corresponding to the minimum value of the distance between the cords is $H_A$, the height measured from the rim base line BL to the position B of the carcass main body 2 corresponding to the maximum value of the distance between the cords is $H_B$, and the height of the rim flange 5 measured from the rim base line BL is $H_f$, it is critically important that the relationship formulae below are satisfied.

$$H_T \geq 8.00$$

$$1.26 \leq H_A \leq 2.14$$

$$2.43 \leq H_B \leq 3.75$$

The tire maximum height $H_T$ is to be equal to or larger than 8.00 because, when the tire maximum height $H_T$ is smaller than 8.00, i.e. the rim flange height $H_f$ exceeds ⅛ of the maximum height of the tire, the problem of durability of the bead portion, which is to be solved by the present invention, is less likely to occur. Accordingly, the present invention is directed to a tire having a relatively small rim flange height $H_f$, i.e. a tire in which a tire maximum height $H_T$ with respect to the rim flange $H_f$ is equal to or larger than 8.00.

Regarding the aforementioned conditions, in a case where $H_A$ is smaller than 1.26, change in the distance between the cords from the bead core 1 to the minimum value position is extremely large, whereby steep change of curvature is required to bend the carcass ply fold-up portion 3 to the carcass main body 2 in a required shape, whereby production of the tire will be difficult.

Further, in this case, bending rigidity of the bead portion in the vicinity of the lower end of the rim flange 5 is decreased and the bead portion is significantly collapse-deformed, whereby shear strain exerted on rubber between the carcass ply fold-up portion 3 and the carcass main body 2 significantly increases. Yet further, shear strain of rubber along the carcass ply fold-up portion 3 significantly increases, whereby separation of rubber on the carcass main body side, of the carcass ply fold-up portion 3, from rubber on the rim flange side thereof is caused and the product life of the tire is shortened.

In a case where $H_A$ exceeds 2.14, the position corresponding to the cord-distance minimum value is located toward the outer side in the radial direction too much with respect to the region where compression strain is exerted on the carcass ply folded-up portion 3, whereby compression strain on the inner side in the radial direction, i.e. on the side of the bead core, increases.

Further, in this case, since the carcass ply fold-up portion 3 in the vicinity of the rim flange 5 has a shape protruding in the direction opposite to the direction in which the carcass main body 2 protrudes, shear strain exerted on rubber between the outer surface of the bead portion and the carcass ply fold-up portion 3 increases, whereby it is difficult to suppress occurrence of separation between the rubber and the carcass ply fold-up portion 3.

The height $H_A$ preferably satisfies the relationship formula $1.4 \leq H_A \leq 1.9$ so that the position corresponding to the minimum value is set in a range where compression strain exerted on the carcass ply fold-up portion 3 exhibits a significant increase and thus an advantageous effect of the present invention can be effectively demonstrated.

Next, in a case where $H_B$ is smaller than 2.43, compression strain exerted on the carcass ply fold-up portion 3 at the position corresponding to the cord-distance maximum value is increased, whereby an effect of reducing compression strain by exerting tensile strain on the carcass ply fold-up portion 3 is decreased and it is difficult to suppress fatigue fracture of the carcass ply fold-up portion 3.

In a case where $H_B$ exceeds 3.75, the position corresponding to the cord-distance maximum value is too remote from the region where compression force is exerted, whereby an effect of reducing compression strain by exerting tensile strength on the carcass ply fold-up portion 3 is decreased and it is difficult to suppress fatigue fracture of the carcass ply fold-up portion 3.

Further, in this case, tensile force exerted on the carcass ply fold-up portion 3 is increased in a region of the sidewall portion in the vicinity of the end of the carcass ply fold-up portion 3, whereby this tensile force is exerted in the direction of pulling the end of the carcass ply fold-up portion out of the bead core 1. As a result, shear strain of rubber in the vicinity of the end of the carcass ply fold-up portion 3 increases and cracks are generated at the end of the carcass ply fold-up portion 3.

The height $H_B$ preferably satisfies the relationship formula $2.8 \leq H_B \leq 3.4$ so that the position corresponding to the cord-distance maximum value is set in a range where compression strain is significantly reduced by decreasing compression force by strongly exerting tensile force thereon and thus an advantageous effect of the present invention can be effectively demonstrated.

Further, it is important that a ratio b/a of the cord-distance maximum value b with respect to the cord-distance minimum value a exceeds 1.00. In a case where the ratio b/a is not larger than 1.00, it is impossible to reduce compression strain. Specifically, tensile force does not increase in a region T where tensile deformation occurs in a shape having a b/a ration not larger than 1.00, whereby an effect of sufficiently reducing compression strain is lost. As a result, fatigue fracture of the carcass ply fold-up portion 3 cannot be suppressed.

In the present embodiment, the ratio b/a is preferably set in the range of 1.40 to 4.00 in order to prevent separation from occurring due to increased heat generation or heat accumulation in rubber between the carcass ply fold-up portion 3 and the carcass main body 2, which increased heat generation or heat accumulation is caused by increase in thickness of the bead portion as a whole, in particular, in the vicinities of the position corresponding to the cord-distance maximum value.

Further, the ratio b/a is preferably set in the range of 2.00 to 3.00 to suppress fatigue fractures of the carcass ply fold-up portion 3 and increase in heat generation or heat accumulation in rubber between the carcass ply fold-up portion 3 and the carcass main body 2 in a heavy load or low internal pressure environment.

EXAMPLES

Pneumatic radial test tires for a construction vehicle, having size of 59/80 R63, were prepared according to the structure as shown in FIG. 2, with various specifications as shown in Tables 1 to 4, respectively. The test tires thus prepared were assembled with rims having width of 1117.6 mm and flange height $H_f$ of 127 mm and the internal pressure of the tires was set at the prescribed 600 kPa. The maximum height $H_T$ of each tire is 9.21 times as much as the flange height $H_f$.

Figure 5:
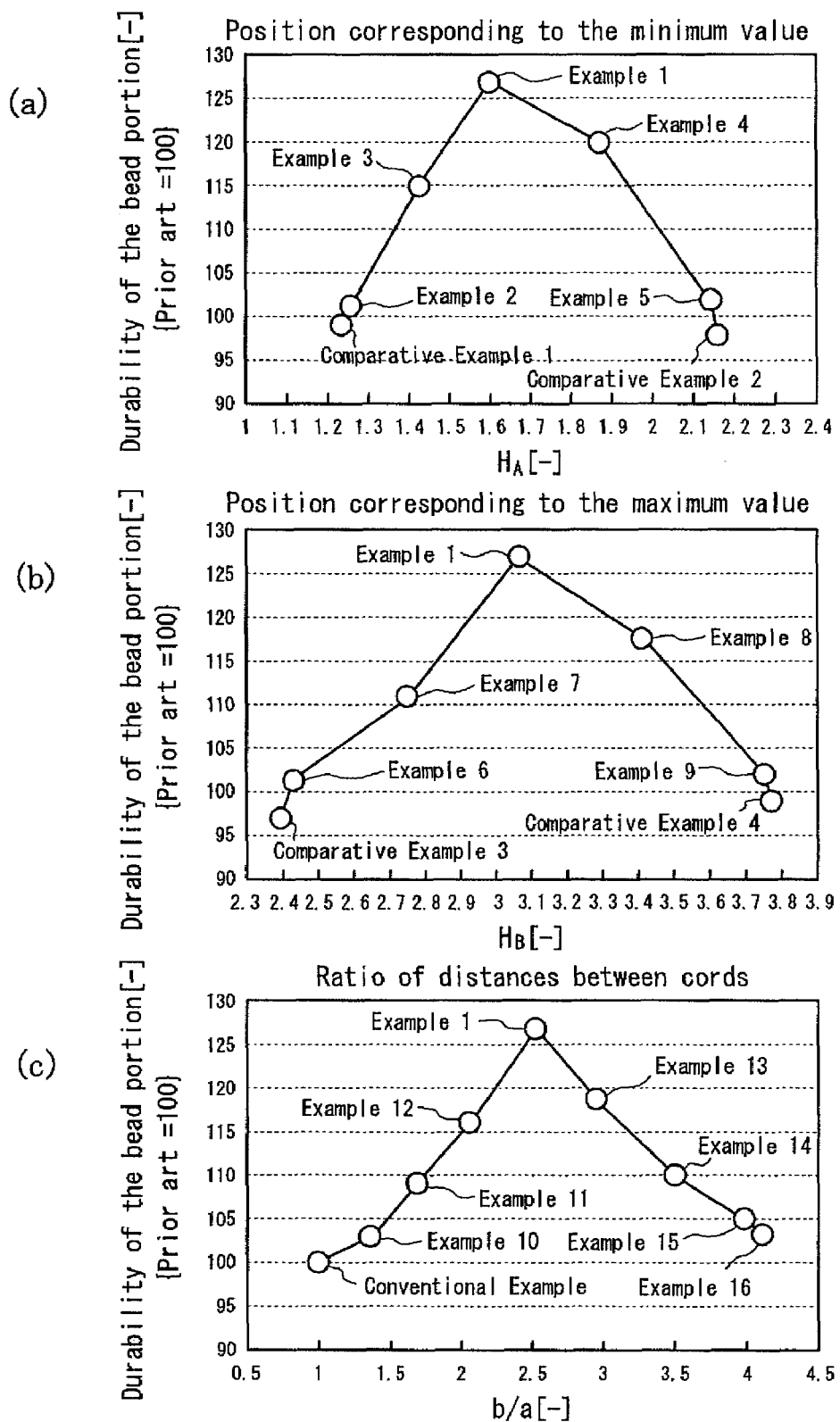
FIGS. 5(a), 5(b) and 5(c) are views showing: relationship between the position corresponding to the minimum value and the durability of a bead portion; relationship between the position corresponding to the maximum value and the durability of a bead portion; and relationship between the value of ratio b/a of the maximum value b with respect to the minimum value a, of distance between cords of the carcass main body and the carcass ply fold-up portion and the durability of a bead portion.

The tire wheels thus obtained were subjected to durability tests for the bead portions thereof. The results are shown in Tables 1 to 4. FIGS. 5(a), 5(b) and 5(c) show effects of the height position corresponding to the cord-distance minimum value, the height position corresponding to the cord-distance maximum value, and the ratio b/a of the maximum value b with respect to the minimum value a, of distance between cords of the carcass main body and the carcass ply fold-up portion, on durability (index value) of the bead portion, respectively.

Durability of the bead portion was evaluated by a test in which load, which is 150-180% of the normal load (996.4 kN), was applied as drum load by the step load method by using a drum durability tester having drum diameter of 7 m and rotating at drum speed of 8 km. "Step load method" represents a method of: in applying drum load to a pneumatic tire to be measured for 12 hours, applying 150% of normal load as the starting load and increasing the load by 10% each time to eventually apply 180% of the normal load to the tire. The results are expressed as index values each relative to the corresponding evaluated value of Conventional Example being 100.

Further, broken sites were analyzed by cutting and dissecting each pneumatic tire which had been tested.

TABLE 1

| Tire having conventional design | |
|---|---|
| | Conventional Example |
| Minimum value position $H_A$ | — |
| Maximum value position $H_B$ | — |
| Ratio b/a of distances between cords | 1.00 (distance between cords is constant) |
| Bead durability (Index) | 100 |
| Broken sites | Fatigue fracture |

*1 Fatigue fracture: fatigue fracture due to compression strain at a carcass ply fold-up portion
*2 Fold-up rubber fracture: separation due to shear strain of rubber along a carcass ply fold-up portion
*3 Intermediate rubber heat generation: separation due to heat generation of rubber between a carcass main body portion and a carcass ply fold-up portion

TABLE 2

| Position corresponding to the minimum value (see FIG. 5(a)) | | | | | | | |
|---|---|---|---|---|---|---|---|
| | Example 1 | Comparative Example 1 | Example 2 | Example 3 | Example 4 | Example 5 | Comparative Example 2 |
| Minimum value position $H_A$ | 1.60 | 1.24 | 1.26 | 1.43 | 1.87 | 2.14 | 2.16 |
| Maximum value position $H_B$ | 3.06 | 3.06 | 3.06 | 3.06 | 3.06 | 3.06 | 3.06 |

TABLE 2-continued

Position corresponding to the minimum value (see FIG. 5(a))

| | Example 1 | Comparative Example 1 | Example 2 | Example 3 | Example 4 | Example 5 | Comparative Example 2 |
|---|---|---|---|---|---|---|---|
| Ratio b/a of distances between cords | 2.53 | 2.53 | 2.53 | 2.53 | 2.53 | 2.53 | 2.53 |
| Bead durability (Index) | 127 | 99 | 101 | 115 | 120 | 102 | 98 |
| Broken sites | Fold-up rubber fracture | Fatigue fracture | Fold-up rubber fracture | Fold-up rubber fracture | Fold-up rubber fracture | Fold-up rubber fracture | Fatigue fracture |

*1 Fatigue fracture: fatigue fracture due to compression strain at a carcass ply fold-up portion
*2 Fold-up rubber fracture: separation due to shear strain of rubber along a carcass ply fold-up portion
*3 Intermediate rubber heat generation: separation due to heat generation of rubber between a carcass main body portion and a carcass ply fold-up portion

TABLE 3

Position corresponding to the maximum value (see FIG. 5(b))

| | Example 1 | Comparative Example 3 | Example 6 | Example 7 | Example 8 | Example 9 | Comparative Example 4 |
|---|---|---|---|---|---|---|---|
| Minimum value position $H_A$ | 1.60 | 1.60 | 1.60 | 1.60 | 1.60 | 1.60 | 1.60 |
| Maximum value position $H_B$ | 3.06 | 2.40 | 2.43 | 2.75 | 3.41 | 3.75 | 3.77 |
| Ratio b/a of distances between cords | 2.53 | 2.53 | 2.53 | 2.53 | 2.53 | 2.53 | 2.53 |
| Bead durability (Index) | 127 | 97 | 101 | 111 | 118 | 102 | 99 |
| Broken sites | Fold-up rubber fracture | Fatigue fracture | Fold-up rubber fracture | Fold-up rubber fracture | Fold-up rubber fracture | Fold-up rubber fracture | Fatigue fracture |

*1 Fatigue fracture: fatigue fracture due to compression strain at a carcass ply fold-up portion
*2 Fold-up rubber fracture: separation due to shear strain of rubber along a carcass ply fold-up portion
*3 Intermediate rubber heat generation: separation due to heat generation of rubber between a carcass main body portion and a carcass ply fold-up portion

TABLE 4

Ratio b/a of distances between cords (see FIG. 5(c))

| | Example 1 | Conventional Example | Example 10 | Example 11 | Example 12 | Example 13 | Example 14 | Example 15 | Example 16 |
|---|---|---|---|---|---|---|---|---|---|
| Minimum value position $H_A$ | 1.60 | — | 1.60 | 1.60 | 1.60 | 1.60 | 1.60 | 1.60 | 1.60 |
| Maximum value position $H_B$ | 3.06 | — | 3.06 | 3.06 | 3.06 | 3.06 | 3.06 | 3.06 | 3.06 |
| Ratio b/a of distances between cords | 2.53 | 1.00 | 1.36 | 1.69 | 2.06 | 2.95 | 3.51 | 4.00 | 4.12 |
| Bead durability (Index) | 127 | 100 | 103 | 109 | 116 | 119 | 110 | 105 | 103 |
| Broken sites | Fold-up rubber fracture | Fatigue fracture | Fold-up rubber fracture | Fold-up rubber fracture | Fold-up rubber fracture | Fold-up rubber fracture | Intermediate rubber heat generation | Intermediate rubber heat generation | Intermediate rubber heat generation |

*1 Fatigue fracture: fatigue fracture due to compression strain at a carcass ply fold-up portion
*2 Fold-up rubber fracture: separation due to shear strain of rubber along a carcass ply fold-up portion
*3 Intermediate rubber heat generation: separation due to heat generation of rubber between a carcass main body portion and a carcass ply fold-up portion From Tables 1 to 4, when Conventional Example where the ratio b/a of distances between cords is 1.00 (constant) and the distance between cords does not have the maximum and minimum values is compared with Examples where the distance between cords has the maximum value and the minimum value, respectively, it is understood that durability of a bead portion has been improved in all of Examples. Further, when the pneumatic radial tire of Comparative Example 4 where the maximum value corresponding position $H_B$ is within the range of JP 04-185510 is compared with a pneumatic radial tire of Examples by conducting the aforementioned durability test and measuring durability of bead portions, it is understood that the pneumatic radial tires of Examples are better than the pneumatic radial tire of Comparative Example 4.

From FIGS. 5(a)-5(c), it is understood that durability of bead portions is enhanced in the cases where the minimum value corresponding position $H_A$ is around 1.6, the maximum value corresponding position $H_B$ is around 3.1, and the ratio b/a of distances between cords is around 2.5. Specifically, it is understood that: in the case where the minimum value corresponding position $H_A$ is around 1.6, compression strain of a carcass ply fold-up portion is effectively reduced; in the case where the maximum value corresponding position $H_B$ is around 3.1, tensile force is effectively exerted on a carcass ply fold-up portion; and in the case where the ratio b/a of distances between cords is around 2.5, reduction of compression strain and effective exertion of tensile force are achieved in the optimum manner.

The invention claimed is:

1. A pneumatic tire, comprising a carcass including a carcass main body constituted of a ply which is made by rubber coated plural cords extending in a toroidal shape across a pair of bead cores, and a carcass ply fold-up portion constituted of the ply folded up around each bead core from the carcass main body side at the tire inner side, toward the tire outer side to extend the outer side in the tire radial direction, wherein:

a cord distance between the carcass main body and the carcass ply fold-up portion gradually decreases from the bead core toward the outer side in the tire radial direction to reach a minimum value a, then gradually increases to a maximum value b;

provided that a height $H_f$ of a flange of an application rim, measured from a base line of the application rim in a state where the tire is assembled with the rim and inflated at a prescribed internal pressure, is 1, heights $H_A$ and $H_B$ measured from the base line to the positions on the carcass main body corresponding to the minimum and the maximum values, respectively, and the maximum height $H_T$ of the tire satisfy relationship formulae below, $H_T \geq 8.00$ $1.26 \leq H_A \leq 2.14$ $2.43 \leq H_B \leq 3.75$;

a value of ratio (b/a) of the maximum value b with respect to the minimum value a of distance between cords of the carcass main body and the carcass ply fold-up portion exceeds 1.00, and the minimum value a and the maximum value b are disposed at intermediate positions along the carcass ply fold-up portion in the tire radial direction.

2. The pneumatic tire of claim 1, wherein the ratio b/a is in the range of 1.40 to 4.00 (1.40 and 4.00 are inclusive).

3. The pneumatic tire of claim 1, wherein the ratio b/a is in the range of 2.00 to 3.00 (2.00 and 3.00 are inclusive).

4. The pneumatic tire of claim 2, wherein the ratio b/a is in the range of 2.00 to 3.00 (2.00 and 3.00 are inclusive).

5. The pneumatic tire of claim 1, wherein $0.18L \leq a \leq 0.33L$, where L is a largest diameter of the bead core.

6. A tire-rim assembly constituted of a pneumatic tire for a construction vehicle and an application rim, the tire comprising as skeleton a carcass including a carcass main body constituted of a ply which is made by rubber coated plural cords extending in a toroidal shape across a pair of bead cores, and a carcass ply fold-up portion constituted of the ply folded up around each bead core from the carcass main body side at the tire inner side, toward the tire outer side to extend toward the outer side in the tire radial direction, wherein:

a cord distance between the carcass main body and the carcass ply fold-up portion gradually decreases from the bead core toward the outer side in the tire radial direction to reach a minimum value a, then gradually increases to a maximum value b and again gradually decreases toward the outer side in the tire radial direction;

provided that a height $H_f$ of a flange of the application rim, measured from a base line of the application rim in a state where the tire is assembled with the rim and inflated at a prescribed internal pressure, is 1, heights $H_A$ and $H_B$ measured from the base line to the positions on the carcass main body corresponding to the minimum and the maximum values, respectively, and the maximum height $H_T$ of the tire satisfy relationship formulae below, $H_T \geq 8.00$ $1.26 \leq H_A \leq 2.14$ $2.43 \leq H_B \leq 3.75$;

a value of ratio (b/a) of the maximum value b with respect to the minimum value a of distance between cords of the carcass main body and the carcass ply fold-up portion exceeds 1.00.

* * * * *